K. STAHL.
SAFETY VALVE.
APPLICATION FILED JUNE 28, 1920.
1,419,177.
Patented June 13, 1922.
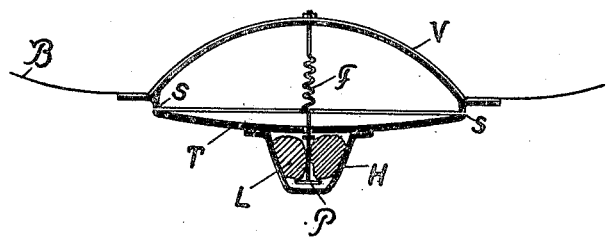
INVENTOR

UNITED STATES PATENT OFFICE.

KARL STAHL, OF FRIEDRICHSHAFEN, GERMANY, ASSIGNOR TO THE FIRM LUFT-SCHIFFBAU ZEPPELIN GESELLSCHAFT MIT BESCHRANKTER HAFTUNG, OF FRIEDRICHSHAFEN, GERMANY.

SAFETY VALVE.

1,419,177. Specification of Letters Patent. Patented June 13, 1922.

Application filed June 28, 1920. Serial No. 392,600.

*To all whom it may concern:*

Be it known that I, KARL STAHL, a citizen of the German Republic, residing at Friedrichshafen, Germany, have invented certain new and useful Improvements in Safety Valves (for which I have filed an application in Germany May 6, 1915), of which the following is a specification.

My invention refers to safety valves and more especially to valves of this kind for use in connection with gas filled balloons and airships.

As is well known, in order to create an overpressure within gas cells, use is made either of the inlet fitting or of a safety valve. Assuming the safety valve of an ascending balloon to be adjusted for instance to a pressure of 10 mm. water column the valve will open as soon as the pressure within the balloon has reached this limit. The position of altitude corresponding to this condition (blowing off altitude) lies above the altitude where the balloon is taut. In the layer of air intermediate this latter altitude and the blow-off altitude the weighted balloon is in a position of stable equilibrium. If pressed downwards by a vertical gust of wind, it will obtain lifting power owing to the high specific weight of the surrounding air. If driven upwards by the wind, it will become heavy as the specific weight of the surrounding air decreases. The laws governing a balloon of constant volume apply in this case. The height of the layer in which this phenomenon occurs, is dependent upon the overpressure which the valve is adjusted for. The desire to increase this overpressure is counteracted by the question of the strength of the envelope. If the envelope of a balloon filled with an overpressure of 10 mm. at 760 mm. and 0 degree C. is only just strained to an admissible degree, then the strain will decrease as soon as the balloon rises. Therefor the adjusted overpressure might fairly be increased at a greater altitude without endangering the envelope.

Now, the object of the present invention is a safety valve with the aid of which the overpressure adjusted at the beginning is increased as the balloon rises to higher altitudes without the admissible strain placed on the envelope being exceeded.

In the drawings affixed to this specification and forming part thereof a safety valve embodying my invention is illustrated by way of example in a diagrammatic section.

V is the valve case fixed in the balloon envelope B. S is the valve seat, T is the valve disk, F is the spring pressing said disk on its seat and being adapted to be placed under suitable tension. In a sheet metal hood H there is disposed a rubber bladder or the like closed on all sides and which at normal atmospheric pressure of 760 mm. is only partly filled with air. If the balloon rises, the bladder will expand and will press on a nut P connected to the spring so as to increase the tension of spring F and thereby to press the valve disk more strongly against its seat. By displacing nut P relatively to the spring the overpressure may be adjusted while the balloon is under way.

I claim:

1. In gas-supported aircraft in combination, a valve, means for keeping said valve closed under a predetermined gas pressure and means influenced by variations of pressure of the surrounding air, for exerting additional closing pressure on said valve.

2. In a device of the kind described in combination a valve, a spring serving to keep said valve closed and means, influenced by variations of pressure of the surrounding air, for varying the tension of said spring.

3. In a device of the kind described in combination a valve, a spring serving to keep said valve closed and a closed bladder partly filled with air at the normal air pressure, disposed so as to act on said spring.

In testimony whereof I affix my signature.

KARL STAHL.